(No Model.)
J. E. BLACKSHAW & G. H. ROGERS.
ADDING MACHINE.
No. 454,838. Patented June 30, 1891.
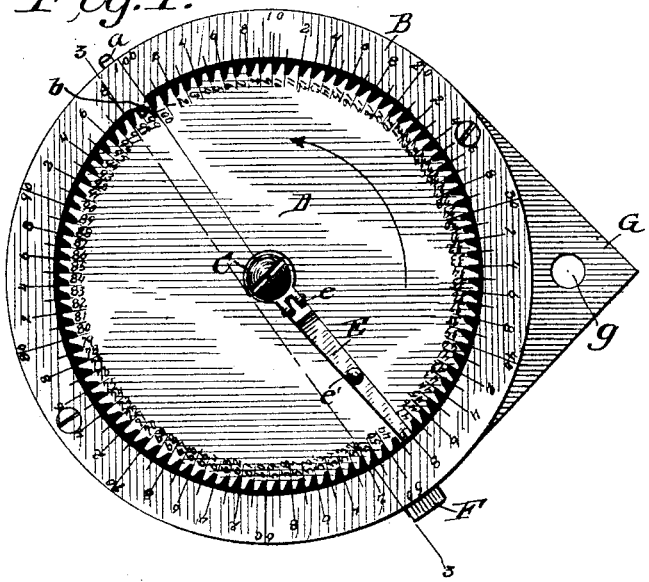
Fig. 1.
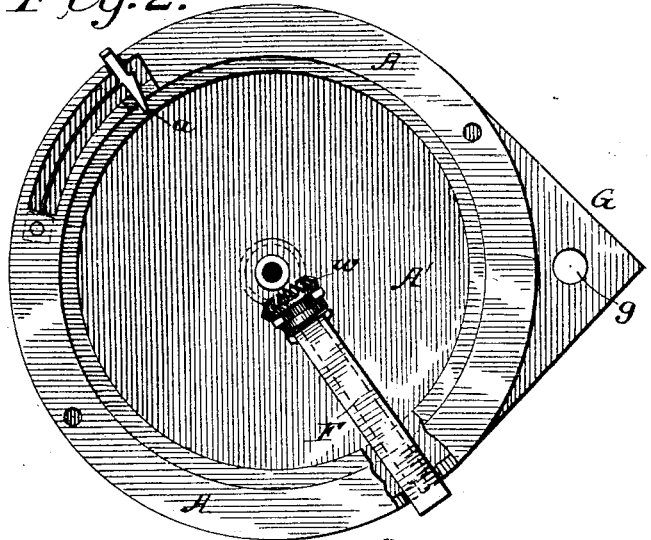
Fig. 2.
Fig. 3.
WITNESSES
Fred G. Dieterich
Edw. W. Byrn
INVENTORS
J. E. Blackshaw
G. H. Rogers
BY
ATTORNEYS

UNITED STATES PATENT OFFICE.

JOSEPH E. BLACKSHAW, OF PITTSBURG, PENNSYLVANIA, AND GEORGE H. ROGERS, OF BIRMINGHAM, ALABAMA.

ADDING-MACHINE.

SPECIFICATION forming part of Letters Patent No. 454,838, dated June 30, 1891.

Application filed July 8, 1890. Serial No. 358,038. (No model.)

*To all whom it may concern:*

Be it known that we, JOSEPH E. BLACKSHAW, of Pittsburg, in the county of Allegheny and State of Pennsylvania, and GEORGE H. ROGERS, of Birmingham, in the county of Jefferson and State of Alabama, have invented a new and useful Improvement in Adding-Machines, of which the following is a specification.

Our invention is in the nature of an improved adding-machine for conveniently, accurately, and expeditiously adding two columns of figures at the same time; and it consists in the peculiar construction and arrangement of parts, which we will now proceed to describe with reference to the drawings, in which—

Figure 1 is a plan view of the device. Fig. 2 is a plan view with the toothed disk and graduated ring removed, and Fig. 3 is a central section through line 3 3 of Fig. 1.

In the drawings, A represents the main frame, of circular form, and whose central portion is depressed or recessed. Upon the upper and outer level of this circular frame is rigidly fixed a graduated ring B, of metal or other suitable material. This ring is provided on its inner periphery with a tooth or spur $b$, and the graduations start with 1, one space removed from the tooth on one side, and extend around the ring to 100, adjoining the first graduation. To save a multiplicity of numbers, the graduations are marked in decimal groups, as 10, 20, 30, 40, &c., and only the alternate units in each group are marked, as 2, 4, 6, and 8. Within this ring and above the central recess is arranged a disk D, having its outer periphery formed with one hundred teeth and one hundred graduation-marks, numbered consecutively from 1 to 100. This disk is centrally pivoted upon a screw C, that fastens it to the main frame, and about this screw there swings freely a radial arm E for manipulating the disk. This arm has a perforated hub portion, through which the axial screw C passes, an articulated joint $e$, which permits the body part of the arm to be lifted away from the disk, a knob or handle $e'$ for operating the arm, and a tooth $e^2$ at its outer end, which drops down into the notches between the teeth at the outer periphery of the disk D. This arm is for the purpose of turning the disk a regulated distance, dependent upon the number to be added, and for this purpose the arm is seized by its knob, and, being lifted away from the disk, is put down again, with its tooth $e^2$ in the notch opposite to the number to be added, and is then turned radially with the disk, as hereinafter described. In a recess near the outer periphery of the main frame is arranged a spring-detent $a$, whose tooth enters the notches of the disk D and holds it to place, but yields and moves out of engagement when the disk is forcibly turned by the radial arm.

To the main frame is secured a detachable bottom A′, which carries bearings for a screw-shaft $s$. This screw-shaft is arranged in its bearings so that it cannot move longitudinally, and upon its inner end it bears a bevel gear-wheel $w$, which engages with a bevel gear-wheel $u$ on the under side of the disk, both of which bevel-gears are of the same size, so that a single revolution of the disk will make a revolution of the screw-shaft $s$. Above this screw-shaft is arranged in parallel position thereto a graduated bar F, the end of which bar is provided with a nut or right-angular projection $r$, which is screw-threaded interiorly and embraces the screw-shaft. This connection causes the rotation of the screw-shaft to impart a rectilinear longitudinal motion to the bar F. This bar is graduated in spaces which represent the amount of throw that each revolution of the disk gives it, and these graduations serve to indicate by the protruding of the bar from the main frame the hundreds, or each revolution of the disk.

G is an angular or pointed plate fastened to the bottom of the main frame and designed to be used as a pointer, instead of the pencil, for marking the figures of the column as the accountant passes up or down the same. This plate has a perforation $g$, and this perforated plate also serves a useful purpose as a means for hanging up the device when out of use.

In making use of our invention the zero-point of the disk is placed opposite the tooth of the outer ring, and the tooth of the radial arm is then dropped into the notch of the disk opposite the number or numbers to be added, as indicated on the ring. If this be 48 the tooth of the arm is dropped in the notch of the disk opposite "48" on the ring, and the radial arm is swung around until stopped by the tooth or spur of the ring, the disk being meanwhile held by the detent, while the arm is adjusted to the position indicated by the new figure or figures to be added. The successive additions of the numbers marked on the ring, it will be seen, act in a cumulative way on the disk, as it moves always in one direction, and when it has completed a revolution that revolution is indicated upon the graduated bar representing hundreds by the forcing of the same out to the extent of one subdivision.

We are aware that it is not new to construct a disk with a circumferential series of holes corresponding to a set of graduations on a stationary ring and to provide a radially-swinging arm having a pin or tooth adapted to enter any one of said holes to move said disk, and we make no claim to this broad idea.

In our invention the disk has a series of peripheral teeth on its edge, which, lying in the same plane with the detent $a$, serve the double purpose, first, of forming notches into which the tooth $e^2$ of the radial arm falls in order to move said disk, and, secondly, of notches for the detent $a$ to hold the disk to its position at all times except when intentionally moved by the tooth $e^2$ of the arm. The double function of the toothed wheel simplifies the construction of the device and permits of a very accurate and economic division of the disk by gear-cutting machinery.

Having thus described our invention, what we claim as new is—

1. The combination, in an adding-machine, of a stationary graduated ring, a graduated disk arranged within the ring and having its outer periphery toothed to correspond with the graduations, a spring-detent $a$, engaging peripherally with the teeth of said disk, and a centrally-pivoted radial arm having a tooth at its end adapted to engage with the teeth of the disk, substantially as shown and described.

2. The combination of the stationary graduated ring, the graduated disk arranged within the same and provided with a bevel-gear on its under side, a screw-shaft arranged parallel to the disk and having a bevel-gear on its end engaged with the bevel-gear of the disk, and a graduated bar arranged parallel to the screw-shaft and having a screw-threaded projection on the same embracing the screw-shaft, substantially as shown and described.

3. An adding-machine having a pointed plate G on its under side provided with a hole $g$ to serve the double purpose of a pointer and a hanger, substantially as shown and described.

JOSEPH E. BLACKSHAW.
GEO. H. ROGERS.

Witnesses:
CHAS. M. JOHNSTON,
S. A. JOHNSTON.